(12) United States Patent
Corcoran et al.

(10) Patent No.: US 8,364,968 B2
(45) Date of Patent: Jan. 29, 2013

(54) DYNAMIC WEB SERVICES SYSTEMS AND METHOD FOR USE OF PERSONAL TRUSTED DEVICES AND IDENTITY TOKENS

(75) Inventors: David T Corcoran, Hamilton, IN (US); Christopher Osgood, Poquoson, VA (US)

(73) Assignee: Symantec Corporation, Mountain View, CA (US)

( * ) Notice: Subject to any disclaimer, the term of this patent is extended or adjusted under 35 U.S.C. 154(b) by 1053 days.

(21) Appl. No.: 11/750,077

(22) Filed: May 17, 2007

(65) Prior Publication Data

US 2007/0300057 A1 Dec. 27, 2007

Related U.S. Application Data

(60) Provisional application No. 60/747,703, filed on May 19, 2006.

(51) Int. Cl.
H04L 29/06 (2006.01)
(52) U.S. Cl. .................... 713/182; 713/185; 713/186
(58) Field of Classification Search .............. 713/182, 713/185, 186
See application file for complete search history.

(56) References Cited

U.S. PATENT DOCUMENTS

| | | | |
|---|---|---|---|
| 6,199,114 B1 | 3/2001 | White et al. | |
| 6,385,729 B1 | 5/2002 | DiGiorgio et al. | |
| 6,931,131 B1 | 8/2005 | Becker et al. | |
| 6,934,841 B2 | 8/2005 | Boyles et al. | |
| 6,994,650 B2 | 2/2006 | Allen et al. | |
| 7,047,558 B1 | 5/2006 | Mariana | |
| 7,111,051 B2 | 9/2006 | Nobakht et al. | |
| 7,228,438 B2 * | 6/2007 | Bushmitch et al. | 713/193 |
| 7,565,536 B2 * | 7/2009 | Vassilev et al. | 713/168 |
| 7,613,639 B1 * | 11/2009 | Ogg | 705/35 |
| 2001/0025878 A1 | 10/2001 | Hendrick | |
| 2001/0039583 A1 | 11/2001 | Nobakht et al. | |
| 2002/0029254 A1 | 3/2002 | Davis et al. | |
| 2002/0031230 A1 | 3/2002 | Sweet et al. | |
| 2002/0124092 A1 | 9/2002 | Urien | |
| 2002/0158123 A1 * | 10/2002 | Allen et al. | 235/380 |

(Continued)

FOREIGN PATENT DOCUMENTS

| EP | 1 199624 | 4/2002 |
|---|---|---|
| EP | 1 528 451 | 5/2005 |

OTHER PUBLICATIONS

International Search Report and Written Opinion for PCT/US2007/069253, 10 pages.

(Continued)

*Primary Examiner* — Edan Orgad
*Assistant Examiner* — Bradley Holder
(74) *Attorney, Agent, or Firm* — Lowenstein Sandler PC (57) ABSTRACT

The present invention involves one or more computers that provide software controls to enable a web application to interface with a personal trusted device. The server side of the computer system comprises: a server-based framework process; a device for receiving requests from the client computer and determining which software controls to send in response; and a device for digitally signing and encrypting the software controls before sending them to the client computer so that their authenticity can be verified. The client side of the computer system comprises: a client web browser that runs on a computer; a device for transmitting requests to the server computer and for receiving responses from those requests; a device for decrypting software controls so that the authenticity of their digital signature can be verified; and a connection to one or more personal trusted devices. An authentication proxy may be used to mutually authenticate a client user and server process using personal trusted devices.

20 Claims, 9 Drawing Sheets

U.S. PATENT DOCUMENTS

| | | | |
|---|---|---|---|
| 2003/0070100 A1* | 4/2003 | Winkler | 713/202 |
| 2003/0217271 A1* | 11/2003 | Calder | 713/173 |
| 2004/0088578 A1* | 5/2004 | Chao et al. | 713/201 |
| 2004/0172552 A1 | 9/2004 | Boyles et al. | |
| 2005/0188360 A1 | 8/2005 | de Jong | |
| 2005/0194441 A1* | 9/2005 | Truong | 235/385 |
| 2005/0278544 A1* | 12/2005 | Baxter | 713/182 |
| 2006/0036863 A1 | 2/2006 | Miller et al. | |
| 2006/0107038 A1 | 5/2006 | Kipnis et al. | |
| 2006/0129840 A1* | 6/2006 | Milgramm et al. | 713/186 |
| 2006/0163344 A1 | 7/2006 | Nwosu | |
| 2007/0066311 A1* | 3/2007 | Reibel et al. | 455/445 |
| 2007/0095927 A1* | 5/2007 | Pesonen | 235/492 |

OTHER PUBLICATIONS

International Preliminary Report on Patentability for PCT/US2007/069253, Nov. 21, 2008, 5 pages.

* cited by examiner

DYNAMIC WEB SERVICES SYSTEMS AND METHOD FOR USE OF PERSONAL TRUSTED DEVICES AND IDENTITY TOKENS

CROSS-REFERENCE TO RELATED APPLICATIONS

The present application claims priority under 35 U.S.C. §119(e) of U.S. Patent Provisional Application Ser. No. 60/747,703, filed May 19, 2006, the disclosures of which are explicitly incorporated by reference.

BACKGROUND OF THE INVENTION

1. Field of the Invention

The invention relates to identity authentication systems and methods. More specifically, the field of the invention is that of server based software for verification and authentication of the client user.

2. Description of the Related Art

The growth of the Internet and the wide availability of broadband and other high-speed access to the Internet have made it more feasible for applications to be offered as web-based services instead of software that must be purchased and installed on individual client computing devices. Many of these web based applications use development techniques that make the applications feel more responsive by exchanging only small amounts of data between the user's interface and the server. These techniques make it possible to increase an application's interactivity, usability, and speed without requiring installation of software on the user's machine.

The use of web-based services as replacements of installed software makes it necessary for the application to be able to authenticate the user of the application. Authentication verifies that the user is allowed to use the application and verifies that the user is only able to access authorized data. As the need for security increases, traditional password systems are no longer able to provide sufficient security. Identity authentication is more frequently being provided through a variety of methods, including the use of personal trusted devices and identity tokens such as smart cards or biometric scanners.

Personal trusted devices and identity tokens have many varied methods for authenticating a user's identity and allowing access to secure applications or data. However, because of the very nature of security requirements, the operating systems and software algorithms that drive these devices cannot be open. The application providers and the makers of personal trusted devices and identity tokens must create integrations between their systems to allow an application to be able to "understand" the authentication provided by the device or token.

The non-dynamic nature of communication between the applications and the devices or tokens means that a person who has such a device or token is only able to use it for authentication with previously enabled applications. The design and programming necessary to integrate a particular application with a particular device or token is platform—and browser—specific and often requires the installation of software on the user's machine. This often requires specific hardware and software modifications to the user's machine in order to install a new device or token significant work is required. Management of current identity and verification devices and tokens is a difficult task which consumes significant information technology resources.

SUMMARY OF THE INVENTION

The present invention provides a server-based framework for utilizing personal trusted devices (PTDs) such as identity tokens through web applications while not requiring initial footprint installation on the client computing device. A Virtual Machine (VM) is sent from the server-based framework to the client web browser as part of the Token Browser Control (TBC). The VM requires that all requests made to the PTD are digitally signed and encrypted by a trusted source. The VM is used as an engine to broker communications between the Token Agent API (TAA), Token Specific Modules (TSMs) and the PTD. The TAA is dynamically provided by the web server, so it can change or be updated dynamically to match the capabilities of the available PTD and the functionality required by the web application. Also the Application Program Interface ("API") masks the specific browser and platform type, providing functionality that is not dependent on a particular browser or platform. This provides access to exactly the capabilities that the web application needs in order to utilize the PTD without requiring custom programming for each combination of PTD platform and browsers.

The present invention identifies the presence, type and data model of a PTD through a Token Discovery Module (TDM) that is requested from the web server by the TAA. Once the PTD has been identified, the server based framework sends the appropriate Token Specific Module (TSM) to the VM to be used by the web application. The web application uses the TSM only through the TAA. This provides an abstract and agnostic interface to the web application and maintains a secure interface to the PTD. This model allows changes in the PTD, and its data models and capabilities, while only requiring that additional TSMs be available from the server.

The benefits of this model over previous methods include: centralized support for new types of PTDs and data models without any footprint on the client machine; multiple token types and data models can be centrally supported, are auto-configured, and are seamless to the user; new PTD applications can be provided through an application service provider model; all modules except the TBC are platform independent; each module has a digital signature that is checked by the TBC for self-verification; and, web applications need not be customized to interface with any specific PTD. Although the TBC must be customized from the particular hardware and software of the client machines, the module design of the system allows for the TBC to be relatively small in comparison to other system components, enhancing the efficiency and effectiveness of the system.

The present invention, in one form, relates to a method for interfacing a web application to a PTD comprising the steps of: a user accessing a web application that requires access to a PTD; the user's client web browser downloading or updating a browser control that will download the appropriate controls for the application to interface with the PTD; the digital signing, encryption and decryption of the controls to ensure security; and, the authentication of a transaction when the PTD is verified. The user may access a web application using one of a personal computer connected to a communications network; a web-enabled cell phone; a web-enabled PDA; or other wired or wireless computing device that is able to access a server. The PTD may be a biometric device or a smart card or other identity verification device.

The present invention, in another form, is one or more computing devices for providing software controls to enable a web application to interface with a PTD. The server side of the computer system comprises: a server-based framework process; a device for receiving requests from the client computing device and determining which software controls to send in response; and a device for digitally signing and encrypting the software controls before sending them to the client computing device so that their authenticity can be verified. The client side of the computer system comprises: a client web browser that runs on a client computing device; a device for transmitting requests to the server computer and for receiving responses from those requests; a device for decrypting software controls so that the authenticity of their digital signature can be verified; and, a connection to one or more PTDs.

Another aspect of the invention relates to a machine-readable program storage device for storing encoded instructions for a method of authenticating an account transaction according to the foregoing method.

Another aspect of the invention relates to an SSL Proxy (or "TrustBearer"). The HTTP Proxy is an intermediary program or communications gateway between the server and a client ensuring that exchanges of data between the two are secure. The proxy receives a browser request and connects to an outside server via SSL. The proxy validates the external certificate using an internal certificate store and revocation checks. The proxy then creates an intermediate certificate that has the same properties as the external certificate except that the Certificate Authority is the proxy itself. The proxy responds to the browser request by creating a session using the intermediate certificate. The proxy agent may then be used to broker legacy authentication methods, while providing an additional level of authentication.

The secured TrustBearer Proxy enables injection of passwords such that they are not exposed on the client machine. Passwords are stored in an internal database ("Password Store") using multiple encryption keys. The user's public key and a TrustBearer diversified key are used. To decrypt, TrustBearer passes the data to the client machine. The client machine decrypts the data using its private key and passes it to the TrustBearer proxy. TrustBearer decrypts the final result using a diversified key.

Embodiments of the invention provide systems and software platforms for Personal Trusted Devices (PTDs) including but not limited to: smart cards, biometrics readers, USB key fobs, RFID key fobs, and wireless telephones that: (a) abstract PTD communication methods, data models, authentication models, and capabilities into a single application programming interface used for online applications; (b) provide methods for supporting platform specific PTD's using platform agnostic measures; (c) need no prior installation of software requiring elevated or administrative rights on client computers; (d) work in the same manner across various and diverse operating systems, architectures, and web browsers, including but not limited to: Microsoft Windows, Macintosh OS X, Solaris, and Linux Operating systems, and Internet Explorer, Safari, and Firefox web browsers; and (e) supports new PTD's through a central service, which distributes support modules that contain a single computer software script that can be, used across all supported client platforms, browsers, and hardware architectures. Such embodiments may dynamically chain support modules based on the functionality needed by the web application and verify the integrity of support modules using digital signature verfication prior to inclusion and execution of the support modules. Further embodiments may cache support modules for offline usage of the software platform, which may then be updated as needed using version control when the client is connected online.

Other embodiments may derive a unique identifier from the PTD used for tracking and trend analysis. Such embodiments may restrict PTD usage and authentication handshaking only to limited trusted sites and thereby thwart phishing style attacks. They may also uniquely identify PTD's using a combination of PTD attributes and tracks unsupported PTD's for trend analysis, and generate events from the support modules based on PTD usage which are centrally recorded and used for statistical analysis then used for threat analysis, system optimization, and trend recognition. This may enable single, central deployment of online applications using a single application-programming interface for usage of PTD's, which may assign unique usage behavior to the PTD and online application based on: registration, language and localization, usage trends, and user customizations. Further, such embodiments may link existing, issued PTD's to legacy online authentication mechanisms such as passwords, and provide digital signatures using PTD's for online applications, including but not limited to: voting, notary, contracts, financial transactions, and approval processes, so that strong authentication using PTD's is provided for online applications. This may further allow providing online updates and personalization of PTD's, and encryption and decryption capabilities using PTD's for online transmission of secure data.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limited the scope of the invention in any manner.

DESCRIPTION OF EMBODIMENTS OF THE PRESENT INVENTION

The embodiments disclosed below are not intended to be exhaustive or limit the invention to the precise form disclosed in the following detailed description. Rather, the embodiments are chosen and described so that others skilled in the art may utilize their teachings.

The detailed descriptions which follow are present in part in terms of algorithms and symbolic representations of operations on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired physical signals.

The present invention also relates to an apparatus for performing these operations. This apparatus may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required method steps. The required structure for a variety of these machines will appear from the description below.

The present invention deals with "object-oriented" software, and particularly with an "object-oriented" operating system. The "object-oriented" software is organized into "objects", each comprising a block of computer instructions describing various procedures ("methods") to be performed in response to "messages" sent to the object or "events" which occur with the object. Such operations include, for example, the manipulation of variables, the activation of an object by an external event, and the transmission of one or more messages to other objects.

Messages are sent and received between objects having certain functions and knowledge to carry out processes. Messages are generated in response to user instructions, for example, by a user activating an icon with a "mouse" pointer generating an event. Also, messages may be generated by an object in response to the receipt of a message. When one of the objects receives a message, the object carries out an operation (a message procedure) corresponding to the message and, if necessary, returns a result of the operation. Each object has a region where internal states (instance variables) of the object itself are stored and where the other objects are not allowed to access. One feature of the object-oriented system is inheritance. For example, an object for drawing a "circle" on a display may inherit functions and knowledge from another object for drawing a "shape" on a display.

A programmer "programs" in an object-oriented programming language by writing individual blocks of code each of which creates an object by defining its methods. A collection of such objects adapted to communicate with one another by means of messages comprises an object-oriented program. Object-oriented computer programming facilitates the modeling of interactive systems in that each component of the system can be modeled with an object, the behavior of each component being simulated by the methods of its corresponding object, and the interactions between components being simulated by messages transmitted between objects. Objects may also be invoked recursively, allowing for multiple applications of an object's methods until a condition is satisfied. Such recursive techniques may be the most efficient way to programmatically achieve a desired result.

An operator may stimulate a collection of interrelated objects comprising an object-oriented program by sending a message to one of the objects. The receipt of the message may cause the object to respond by carrying out predetermined functions which may include sending additional messages to one or more other objects. The other objects may in turn carry out additional functions in response to the messages they receive, including sending still more messages. In this manner, sequences of message and response may continue indefinitely or may come to an end when all messages have been responded to and no new messages are being sent. When modeling systems utilizing an object-oriented language, a programmer need only think in terms of how each component of a modeled system responds to a stimulus and not in terms of the sequence of operations to be performed in response to some stimulus. Such sequence of operations naturally flows out of the interactions between the objects in response to the stimulus and need not be preordained by the programmer.

Although object-oriented programming makes simulation of systems of interrelated components more intuitive, the operation of an object-oriented program is often difficult to understand because the sequence of operations carried out by an object-oriented program is usually not immediately apparent from a software listing as in the case for sequentially organized programs. Nor is it easy to determine how an object-oriented program works through observation of the readily apparent manifestations of its operation. Most of the operations carried out by a computer in response to a program are "invisible" to an observer since only a relatively few steps in a program typically produce an observable computer output.

In the following description, several terms which are used frequently have specialized meanings in the present context. The term "object" relates to a set of computer instructions and associated data which can be activated directly or indirectly by the user. The terms "windowing environment", "running in windows", and "object oriented operating system" are used to denote a computer user interface in which information is manipulated and displayed on a video display such as within bounded regions on a raster scanned video display. The terms "network", "local area network", "LAN", "wide area network", or "WAN" mean two or more computers which are connected in such a manner that messages may be transmitted between the computers. In such computer networks, typically one or more computers operate as a "server", a computer with large storage devices such as hard disk drives and communication hardware to operate peripheral devices such as printers or modems. Other computers, termed "workstations", provide a user interface so that users of computer networks can access the network resources, such as shared data files, common peripheral devices, and inter-workstation communication. Users activate computer programs or network resources to create "processes" which include both the general operation of the computer program along with specific operating characteristics determined by input variables and its environment.

The terms "desktop", "personal desktop facility", and "PDF" mean a specific user interface which presents a menu or display of objects with associated settings for the user associated with the desktop, personal desktop facility, or PDF. When the PDF accesses a network resource, which typically requires an application program to execute on the remote server, the PDF calls an Application Program Interface, or "API", to allow the user to provide commands to the network resource and observe any output.

The term "Browser" refers to a program which is not necessarily apparent to the user, but which is responsible for transmitting messages between the PDF and the network server and for displaying and interacting with the network user. Browsers are designed to utilize a communications protocol for transmission of text and graphic information over a world wide network of computers, namely the "World Wide Web" or simply the "Web". Examples of Browsers compatible with the present invention include the Navigator program sold by Netscape Corporation and the Internet Explorer sold by Microsoft Corporation (Navigator and Internet Explorer are trademarks of their respective owners). Although the following description details such operations in terms of a graphic user interface of a Browser, the present invention may be practiced with text based interfaces, or even with voice or visually activated interfaces, that have many of the functions of a graphic based Browser.

Browsers display information which is formatted in a Standard Generalized Markup Language ("SGML") or a Hyper-Text Markup Language ("HTML"), both being scripting languages which embed non-visual codes in a text document through the use of special ASCII text codes. Files in these formats may be easily transmitted across computer networks, including global information networks like the Internet, and allow the Browsers to display text, images, and play audio and video recordings via Hyper Text Transmission Protocol ("HTTP"). The Web utilizes these data file formats to conjunction with its communication protocol to transmit such information between servers and workstations. Browsers may also be programmed to display information provided in an eXtensible Markup Language ("XML") file, with XML files being capable of use with several Document Type Definitions ("DTD") and thus more general in nature than SGML or HTML. The XML file may be analogized to an object, as the data and the style sheet formatting are separately contained (formatting may be thought of as methods of displaying information, thus an XML file has data and an associated method).

The terms "personal digital assistant" or "PDA", as defined above, means any handheld, mobile device that combines computing, telephone, fax, e-mail and networking features. The terms "wireless wide area network" or "WWAN" mean a wireless network that serves as the medium for the transmission of data between a handheld device and a computer. The term "synchronization" means the exchanging of information between a handheld device and a desktop computer either via wires or wirelessly. Synchronization ensures that the data on both the handheld device and the desktop computer are identical.

"SSL" or "Secure Sockets Layer" is a high-level security protocol protecting the confidentiality and security of data while it is being transmitted through the Internet. Based on RSA Data Security's public-key cryptography, SSL is an open protocol that has been submitted to several industry groups as the industry security standard. Denoted by the letters HTTPS in the URL.

In wireless wide area networks, communication primarily occurs through the transmission of radio signals over analog, digital cellular, or personal communications service ("PCS") networks. Signals may also be transmitted through microwaves and other electromagnetic waves. At the present time, most wireless data communication takes place across cellular systems using second generation technology such as code-division multiple access ("CDMA"), time division multiple access ("TDMA"), the Global System for Mobile Communications ("GSM"), personal digital cellular ("PDC"), or through packet-data technology over analog systems such as cellular digital packet data ("CDPD") used on the Advance Mobile Phone Service ("AMPS").

The terms "wireless application protocol" or "WAP" mean a universal specification to facilitate the delivery and presentation of web-based data on handheld and mobile devices with small user interfaces.

Figure 1:
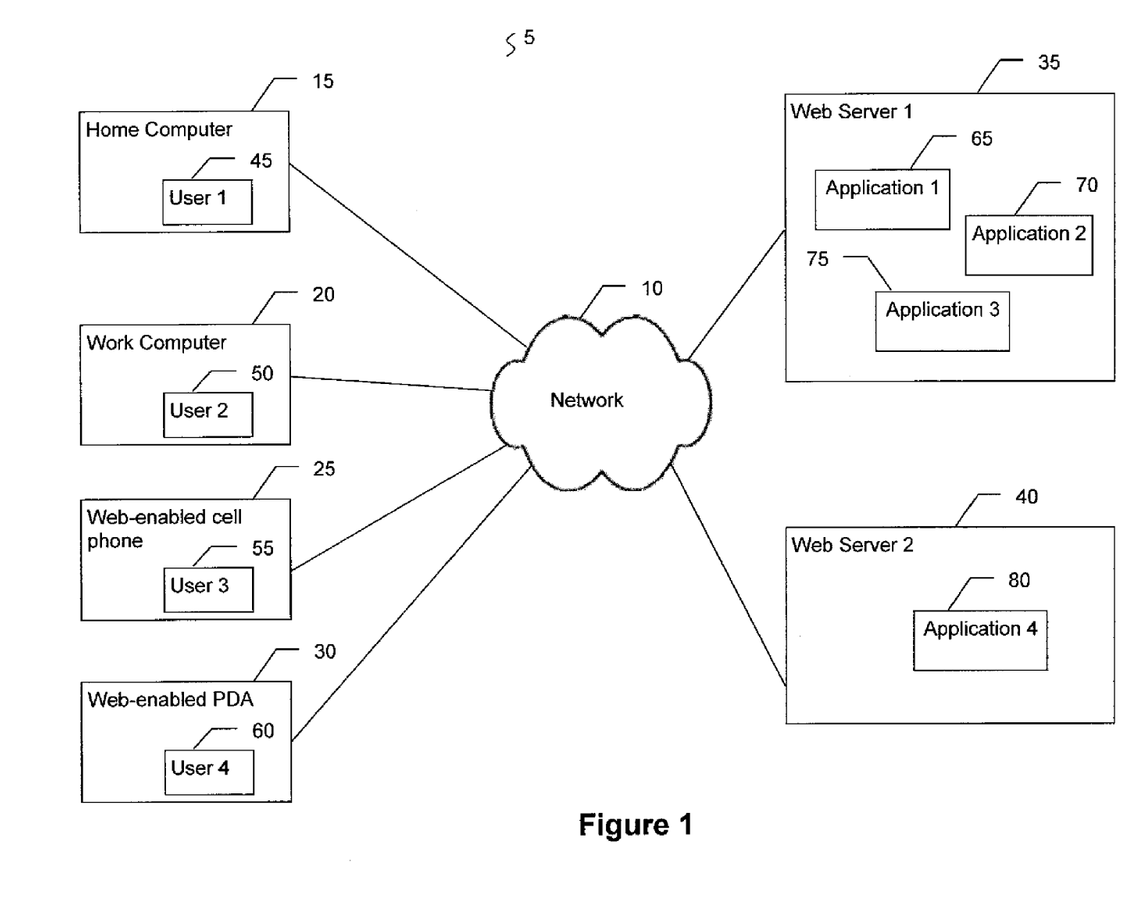
FIG. 1 is a schematic diagrammatic view illustrating an exemplary system implemented according to an embodiment of the invention.

FIG. 1 shows an exemplary block diagram of system 5 implemented in accordance with an embodiment of the invention. System 5 includes network 10, and six access points: home computer 15, work computer 20, web-enabled cell phone 25, web-enabled PDA 30, web server one 35, and web server two 40, each coupled to network 10. In an embodiment of the invention network 10 is the Internet, but in alternate embodiments, the system may also be used over any network of client computing devices including local internets, intranets, local area networks (LANs), wide area networks (WANs), etc. or with any combination of networks.

In an exemplary embodiment, home location 15 is used by user one 45, work location 20 is used by user two 50, web-enabled cellular telephone 25 is used by user three 55, and web-enabled PDA 30 is used by user four 60. User one 45, user two 50, user three 55, and user four 60 utilize a network communication medium, for example, a client computing device. As will be described later, the same user may use the invention at multiple locations, while using their personal trusted device or identity token (such as a user key fob, not shown).

The methods and apparatus for providing dynamic use of personal trusted devices and identity tokens is preferably provided and supported by an Internet content provider operating a predetermined Internet site, which may have one or more locations and operate one or more web servers, such as web server one 35 and web server two 40. FIG. 1 illustrates two web servers, but a content provider is not limited in the number of web servers it may utilize. Web server one 35 includes multiple applications, i.e., application one 65, application two 70 and application three 75; while web server two 40 includes one application, i.e., application four 80. Each of the servers may host one or more web applications, and a single web application may be located on one or more servers. In addition, the content provider may place applications 65, 70, 75, and 80 on any web server 35, 40 in any manner known, or to become known in the art. Further properties of the interaction between the users' client computing devices and the web servers and applications are described later with reference to FIG. 2.

Figure 2:
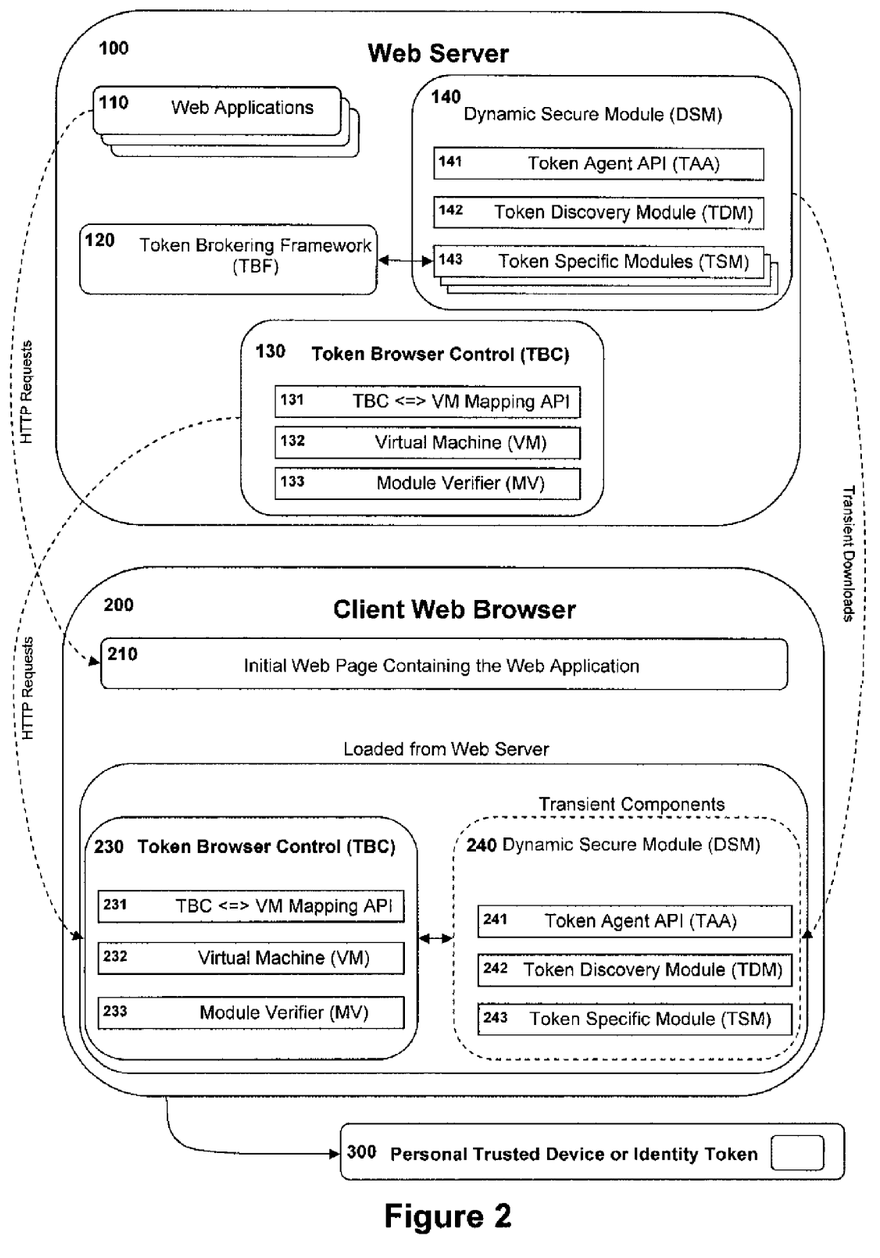
FIG. 2 is a schematic diagrammatic view of the framework components and process flow of the present invention.

FIG. 2 shows a block diagram of the framework components and process flow of the present invention. Each web server 100 runs standard web server software (e.g. Apache, IIS, etc.). Each web server 100 hosts one or more web applications 110 that are, in one embodiment of the invention, server-side scripts (e.g. Perl, PHP, Ruby, etc.) that may generate client-side scripts (e.g. JavaScript, etc.) and user interfaces. A client framework module, Token Brokering Framework (TBF) 120, consists of server-side scripts that handle service requests for Dynamic Security Modules (DSMs) 140 from client computing devices and that determine the configuration of a requesting client computing device, thus serving to dispatch code to the client computing devices to identify a token or trusted device.

DSMs 140 may be pre-existing or be generated upon request. DSMs 140 include byte code that run in Virtual Machine (VM) 132 on client web browser 200. One type of DSM, Token Agent API (TAA) 141, exposes to client applications a safe API that allows only restricted access to local system services. Another type of DSM, Token Discovery Module (TDM) 142, discovers the types of Personal Trusted Devices or Identity Tokens (PTDs) 300 available to client web browser 200 so that a more specialized DSM 140 may be requested (examples of PTDs include, but are not limited to, smart cards, biometrics readers, USB key fobs with flash memory, user key fobs with RFID tags, and wireless telephones). A third type of DSM, Token Specific Module (TSM) 143, provides specialized functionality for utilizing and managing specific token 300, such as verifying the identity of an individual using the client computing device.

Web server 100 stores Token Browser Controls (TBCs) 130 which include binary components that are capable of running on client web browser 200. These TBCs 130 consist of API 131 that connects client-side script (e.g. JavaScript, etc.) and user interfaces to Virtual Machine (VM) 132. Virtual Machine 132 runs DSM 140 code and has full access to local system services on the client machine (e.g. PC/SC, OpenSSL, etc.). Module Verifier (MV) 133 decrypts signed DSM 140 code and verifies its authenticity.

Each client computing device runs standard web browser 200 (e.g. Internet Explorer, Firefox, Safari, etc.). A user who desires to access one of web applications 110 directs client web browser 200 to initial web page 210 that allows access to web application 110 and that contains client-side scripts and a visual interface for accessing web application 110. In a process that is described in more detail in reference to FIG. 3, an identifying module, Token Browser Control (TBC) 230, is loaded from web server 100, as a service request module to enable the client computing device to send and receive service requests to and from the server. This TBC 230 is a binary component that is sent from web server 100 and installed on the local client computing device. TBC 230 consists of API 231 to access local computer services and interact with an identifying device on the client computing device, Virtual Machine (VM) 232 to run DSM 240 code, and Module Verifier 233 that decrypts and verifies DSM 240 code.

DSMs 240 are downloaded from web server 100 in response to requests made by the client computing device. DSMs 240 include byte code that runs in Virtual Machine (VM) 232 on client web browser 200. One type of DSM, Token Agent API (TAA) 241, exposes to client applications a safe API that allows only restricted access to local system services. Another type of DSM, Token Discovery Module (TDM) 242, may discover the types of PTD 300 available to client web browser 200 so that a more specialized DSM 240 may be requested. A third type of DSM, Token Specific Module (TSM) 243, provides specialized functionality for utilizing and managing a specific PTD 300.

Referencing FIG. 2, a more detailed description of the process flow that occurs when the client computing device requests a transaction that requires access to an attached identifying device between web server 100, client web browser 200, and PTD 300 follows. First, client web browser 200 connects to web server 100 using a supported web browser. The initial web page containing web application 210 gets downloaded from web applications 110 of web server 100 to client web browser 200. Second, client web browser 200 checks to see if Token Browser Control (TBC) 230 exists on the client computing device. If it does not exist or is not up-to-date, client web browser 200 requests a download of web server TBC 130 and installs it on the local client computing device. Client-side TBC 230 includes a Virtual Machine (VM) 232, Mapping API 231 for modules, and Module Verifier (MV) 233. MV 233 may validate any signed modules that TBC 230 requests from web server 100 via web server side Token Brokering Framework (TBF) 120. MV 233 validates these modules using certificate based verification. Third, Token Agent API (TAA) 141 is loaded into TBC 230 after TBC 230 is installed. Client-side TAA 241 is responsible for loading and verifying token modules as well as brokering web application requests to the appropriate loaded module. Fourth, when web application 210 makes a request to PTD 300, Client-side TAA 241 requests Token Discovery Module (TDM) 241 which is loaded into the TBC 230. Client-side TDM 242 ascertains the presence and type of PTD 300. MV 233 validates the signature of TDM 242. Fifth, TDM 242 ascertains the presence of PTD 300 and ascertains the type of PTD 300 and provides configuration information for TAA 241, which requests the appropriate Token Specific Module (TSM) 143 to be retrieved. The client receives correct TSM 243, which Module Verifier 233 validates for authenticity. Sixth, web application 210 may now utilize TAA 241, which utilizes TSM 243 as an abstract means of communicating to a variety of PTD types on demand to authenticate a transaction with information from the identifying device.

Figure 3:
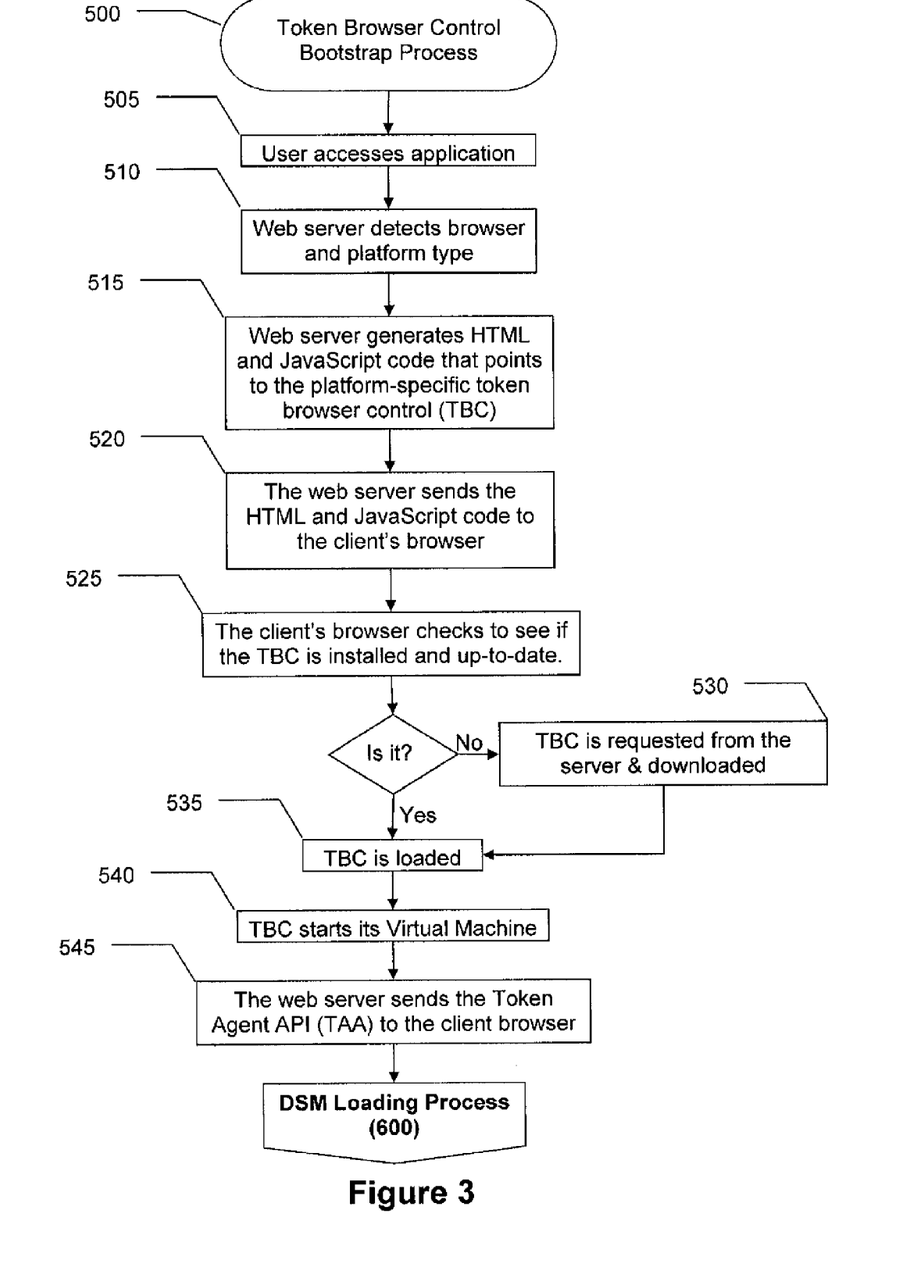
FIG. 3 is a flowchart illustrating the initial bootstrap process of an embodiment of the invention.

FIG. 3 is a flowchart of Token Browser Control Bootstrap Process 500 which is illustrating the initial bootstrap process of an embodiment of the invention. Token Browser Control Bootstrap Process 500 begins when a user accesses a web application in step 505. The web server that hosts the web application detects the client web browser type and the client computing device platform in step 510. The web server generates code that may be run in the client web browser (e.g. HTML, JavaScript, etc.) and that points to the specific Token Browser Control (TBC) required for the platform and browser type in step 515. The web server sends the generated code to the client web browser in step 520. The client web browser check to see if the TBC is already installed and whether it is up-to-date in step 525. If the TBC is not installed or is outdated, the client web browser requests it from the web server in step 530. Once the TBC is installed or updated, it is loaded in step 535. The TBC starts its tiny internal virtual machine in step 540. This virtual machine provides access to the low-level client machine APIs needed to access the PTD through protected access, requiring that all requests to the TBC be digitally signed and encrypted by a trusted source. The TBC abstracts the browser and platform type, allowing all further interaction to the PTD to be completely browser and platform independent. A service request module, the Token Agent API (TAA), may be a JavaScript API that is loaded from the web server into the client browser in step 545. The TAA provides the entry point functions that the web application may utilize for accessing the PTD from within the web application. The TAA also provides functions for retrieving and loading Dynamic Secure Modules (DSMs). Because the TAA is dynamically provided by the server, it may change or be updated dynamically given the particular functionality that the TPD supports as well as the functionality the web application is requesting. It may provide exactly the capabilities that the web application needs to use the PTD. Once the TAA is loaded, the DSM Loading Process begins. This process is described in reference to FIG. 4.

Figure 4:
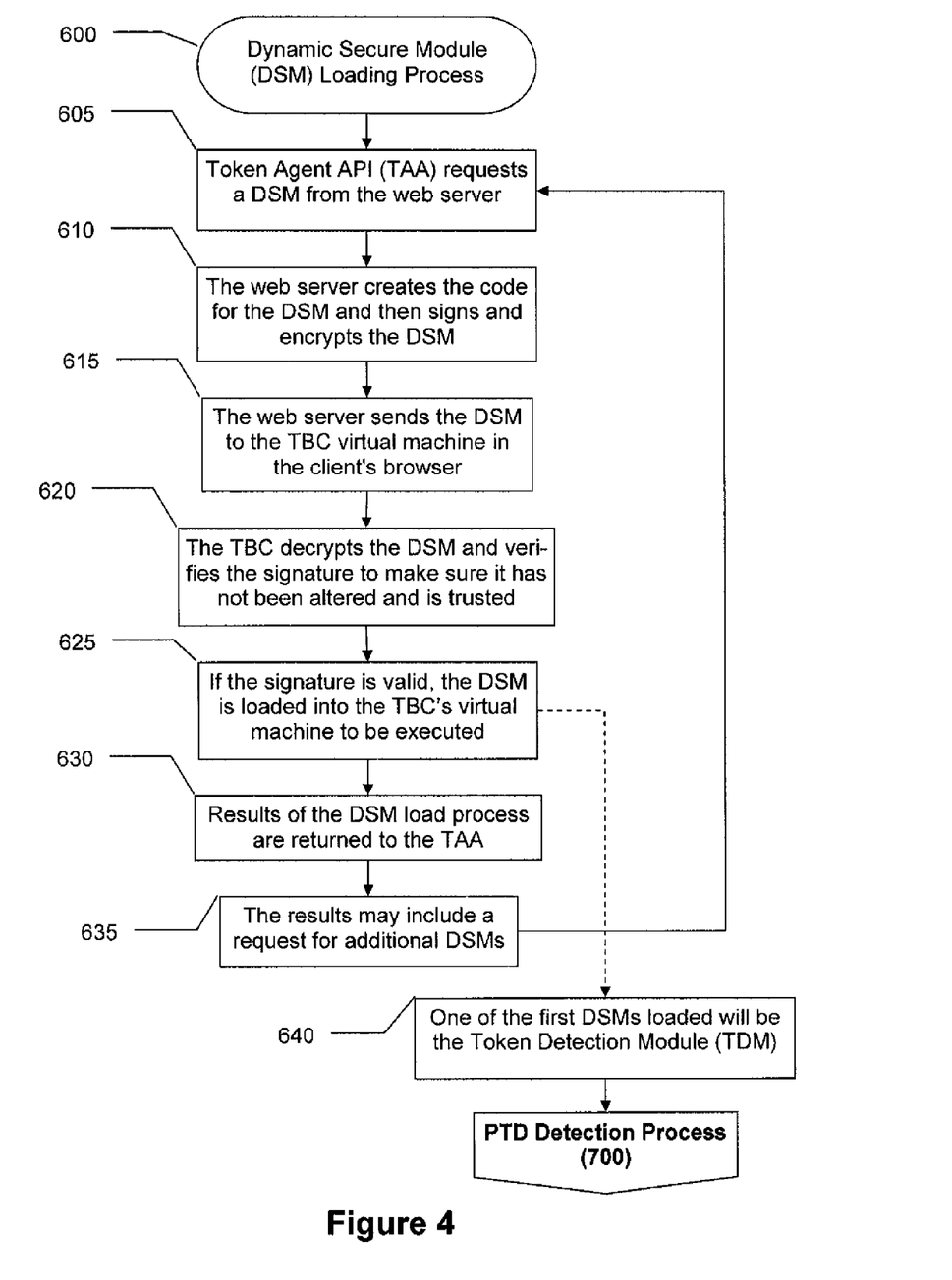
FIG. 4 is a flowchart illustrating a process used by the browser in an embodiment of the invention to dynamically load and execute required processes.

FIG. 4 is a flowchart of Dynamic Secure Module (DSM) Loading Process 600 which is illustrating a process used by the browser in an embodiment of the invention to dynamically load and execute required processes. The Token Agent API (TAA) requests a Dynamic Secure Module (DSM) from the web server in step 605. A DSM could be any routine, set of routines, or data, which is intended to run within the Token Browser Control's (TBC's) virtual machine. DSMs are byte code that is created by the web server from scripted routines and data. The web server may construct the byte code for a DSM by converting scripted routines and data or it may have code for a DSM already created and stored. Once the code is created or identified, it is encrypted and signed in step 610. That DSMs may be dynamically created and signed means that only trusted DSMs may be used by the TBC. Also, encrypting DSMs protects any information they may contain. The web server sends the DSM to the client web browser to be run in the TBC's virtual machine in step 615. When the TBC receives the DSM, it decrypts it and verifies the DSMs signature to ensure that it is trusted and has not been altered in step 620. If the DSM signature is valid, it is loaded into the TBC's virtual machine to be executed in step 625. The results of the DSM load process are returned to the TAA in step 630. The results may include a request to load one or more other DSMs in which case this DSM loading process is repeated for each DSM requested in step 635. One of the first DSMs requested will be the Token Detection Module (TDM) in step 640. When this module is loaded and executed, the PTD Detection Process 700 begins. This process is described in reference to FIG. 5.

Figure 5:
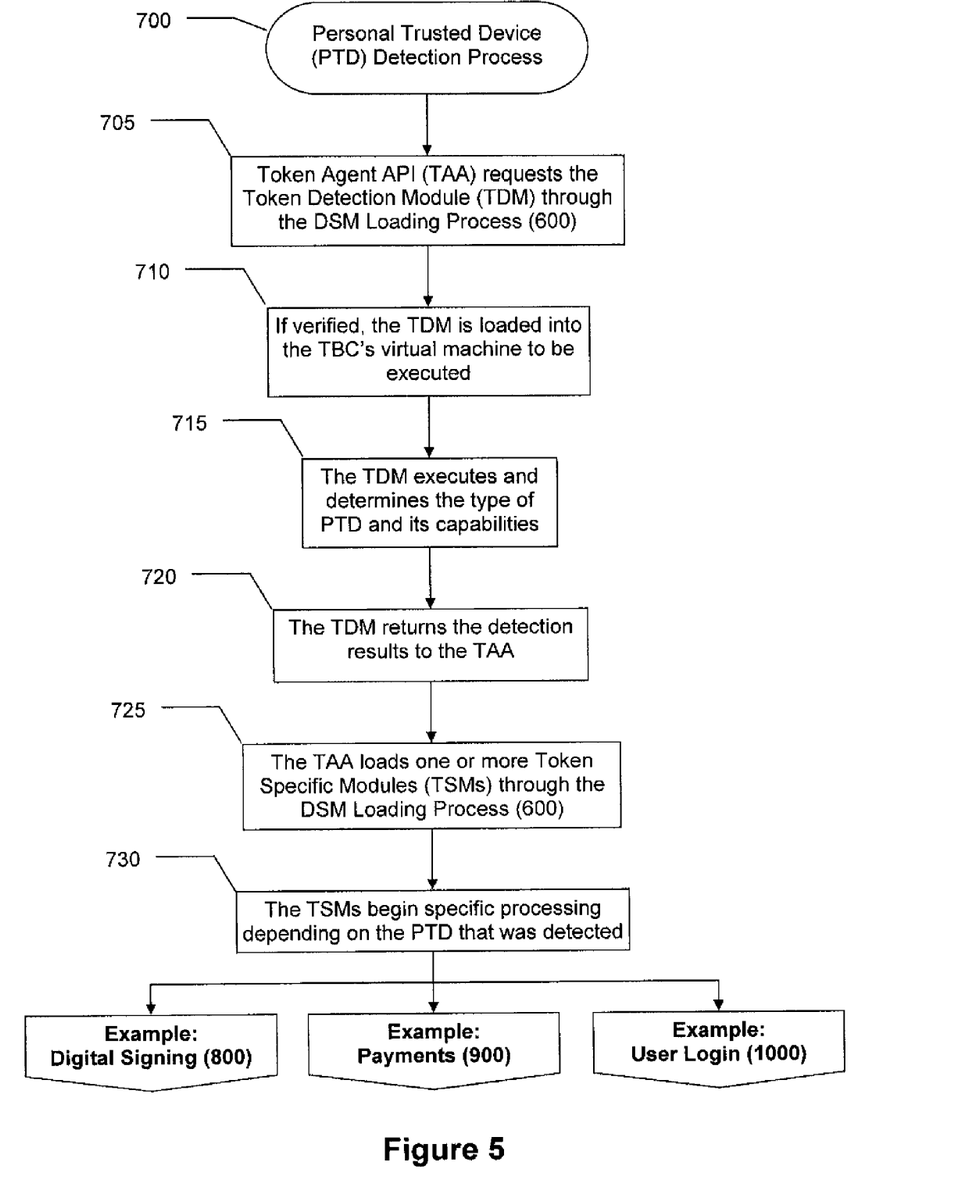
FIG. 5 is a flowchart illustrating a process used by the browser in an embodiment of the invention to determine what capabilities an attached PTD has.

FIG. 5 is a flowchart of PTD Detection Process 700 which is illustrating a process used by the client web browser in an embodiment of the invention to determine what capabilities an attached PTD has. PTD Detection Process 700 is a particular instance of the DSM Loading Process, described in reference to FIG. 4. The TAA requests the Token Detection Module (TDM) through the DSM Loading Process in step 705. If the TDM is verified as trustworthy, it is loaded into the TBC's virtual machine to be executed in step 710. The TDM executes and ascertains the type and configuration of PTD available on the client machine and its capabilities in step 715. Because the TDM is a DSM and may be dynamically produced, it may learn or discover new features that the PTD may provide. The TDM returns the detection results to the TAA in step 720. The TAA loads one or more Token Specific Modules (TSMs) through the DSM Loading Process based on the results returned from the TDM in step 725. Since TSMs are DSMs, they may be dynamically produced to match the discovered features and capabilities of the PTD. Once the TSMs are loaded, they are executed to begin the specific processing requested by the client web browser in step 730. Some examples are described in detail in reference to FIG. 6, FIG. 7, and FIG. 8.

Figure 6:
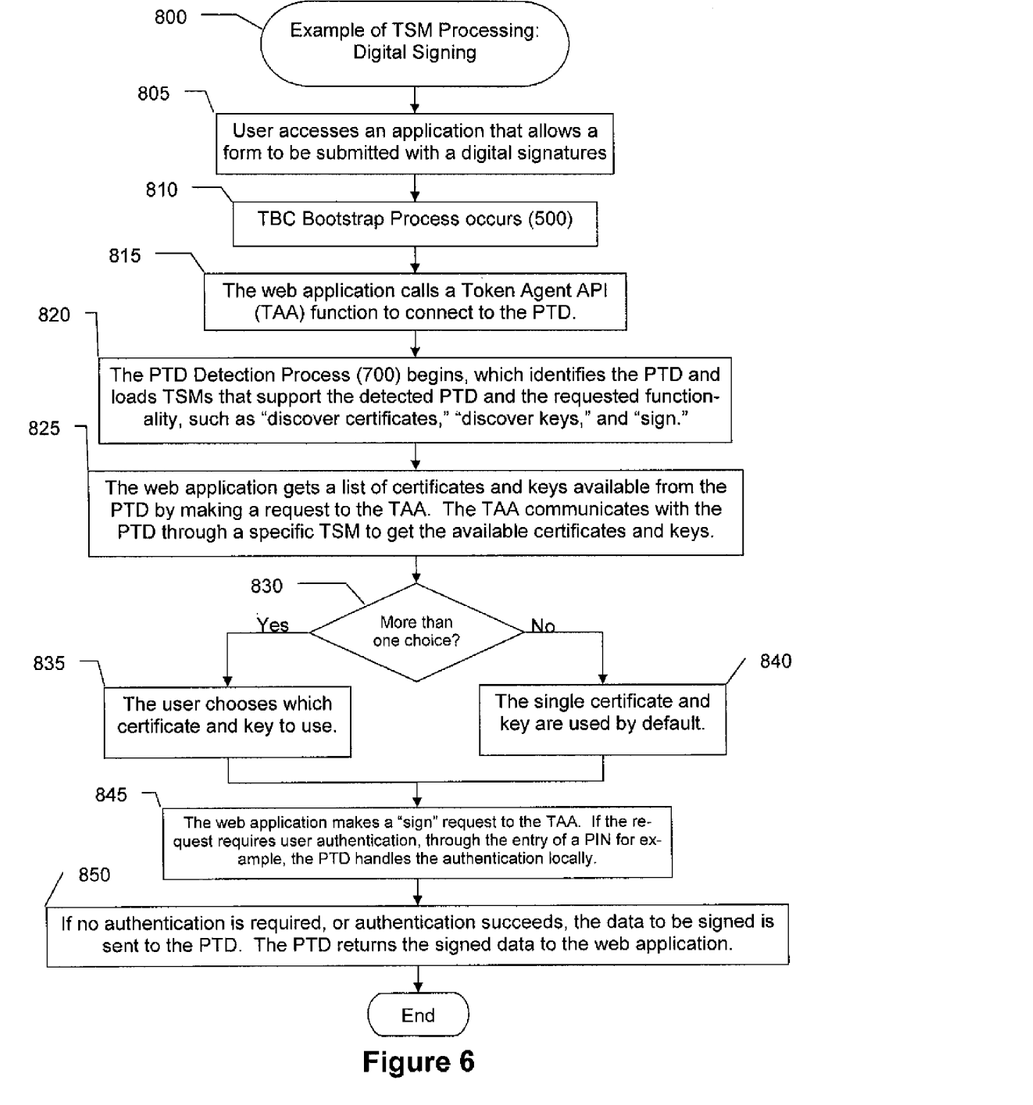
FIG. 6 is a flowchart illustrating one example of using an embodiment of the invention to digitally sign data.

FIG. 6 is a flowchart of Digital Signing Process 800 which is illustrating one example of using an embodiment of the invention to digitally sign data. First, the user uses the client web browser to access a web application that provides the ability to digitally sign an online form, such as an insurance application in step 805. The Token Browser Control (TBC) Bootstrap Process occurs in step 810. The web application calls a Token Agent API (TAA) function to connect to the PTD in step 815. This function begins the PTD Detection Process which identifies the PTD and loads TSMs that support the detected PTD and the functionality requested by the web application, in this case digital signing capability in step 820. Examples of the functionality required for digital signatures are: certificate discovery, key discovery, and signatures in step 820. The web application requires a list of keys and certificates available on the PTD. To get this list, the web application calls into the TAA which uses the specific TSM to retrieve a list of certificates and keys available on the PTD in step 825. This information is returned to the web application which determines if there is more than one available certificate and key in step 830. If there is more than one choice, the user is presented with the list of certificates and keys, chooses the certificate/key to be used for digital signing of the application, and presses a button to perform the digital signature in step 835. If only one signing certificate and key exists, it is used by default in step 840. The web application calls into the TAA, which uses the specific TSM signing function in step 845. If the request requires user authentication, such as verification of a PIN, a pin dialog is presented locally and the PIN is submitted directly to the PTD. This PIN dialog is browser and platform independent and submits the pin directly to the PTD on the client machine without remote server interaction in step 845. If user authentication is not required, or is required and succeeds, the data to be signed is sent to the PTD and the result is returned to the web server to be bound to the online application in step 850. This completes the digital signing process.

Figure 7:
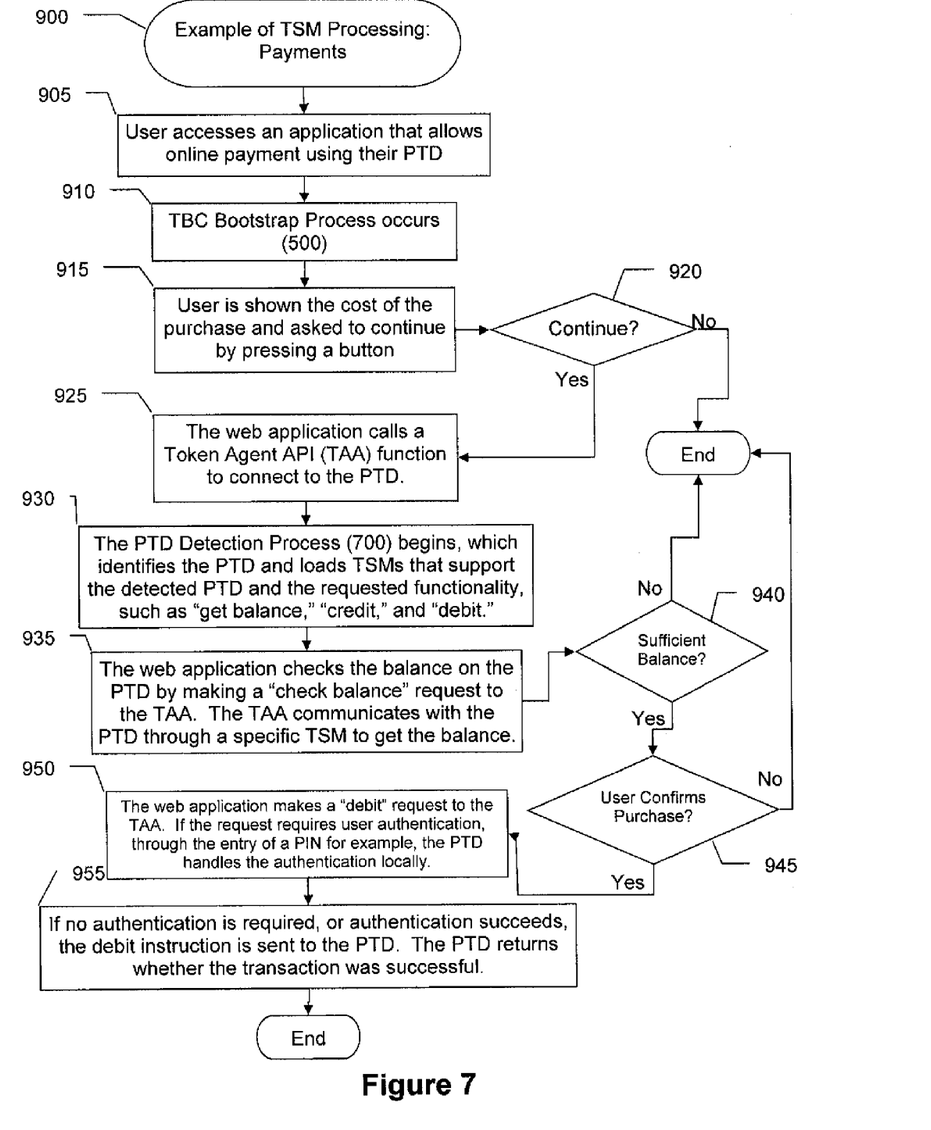
FIG. 7 is a flowchart illustrating another example of using an embodiment of the invention to process payment transactions; and, FIG. 8 is a flowchart illustrating another example of using an embodiment of the invention to verify user login information.

FIG. 7 is a flowchart of Payments process 900 which is illustrating another example of using an embodiment of the invention to process payment transactions. First, the user uses the client web browser to access a web application that provides the ability to pay for an online service using their PTD in step 905. The Token Browser Control (TBC) Bootstrap Process occurs in step 910. The user is presented with the cost of the service requested and asked to continue the purchase by pressing a button in step 915. If the user chooses not to continue in step 920, the process ends. If the user does choose to continue in step 920, then the web application calls a Token Agent API (TAA) function to connect to the PTD in step 925. This function begins the PTD Detection Process which identifies the PTD and loads TSMs that support the detected PTD and the functionality requested by the web application, in this case a payment application in step 930. Examples of the functionality required for a payment application are: credit, debit, and get balance. The web application needs to get the current balance available on the PTD. To get this information, the web application calls into the TAA which uses the specific TSM to retrieve the current balance on the PTD in step 935. If the balance is less than the amount to be debited, a failure occurs and the process ends in step 940. If there is a sufficient balance, the user is presented with their current balance and asked to confirm the purchase in step 945. If the user does not proceed, the process ends. If the user does confirm the purchase, the web application calls into the TAA which uses the specific TSM debit function in step 950. If the request requires user authentication, such as verification of a PIN, a pin dialog is presented locally and the PIN is submitted directly to the PTD. This PIN dialog is browser and platform independent and submits the pin directly to the PTD on the client machine without remote server interaction in step 950. If user authentication is not required, or is required and succeeds, the debit instruction is sent to the PTD and the PTD returns whether the transaction was successful in step 955. This completes the online payment process.

Figure 8:
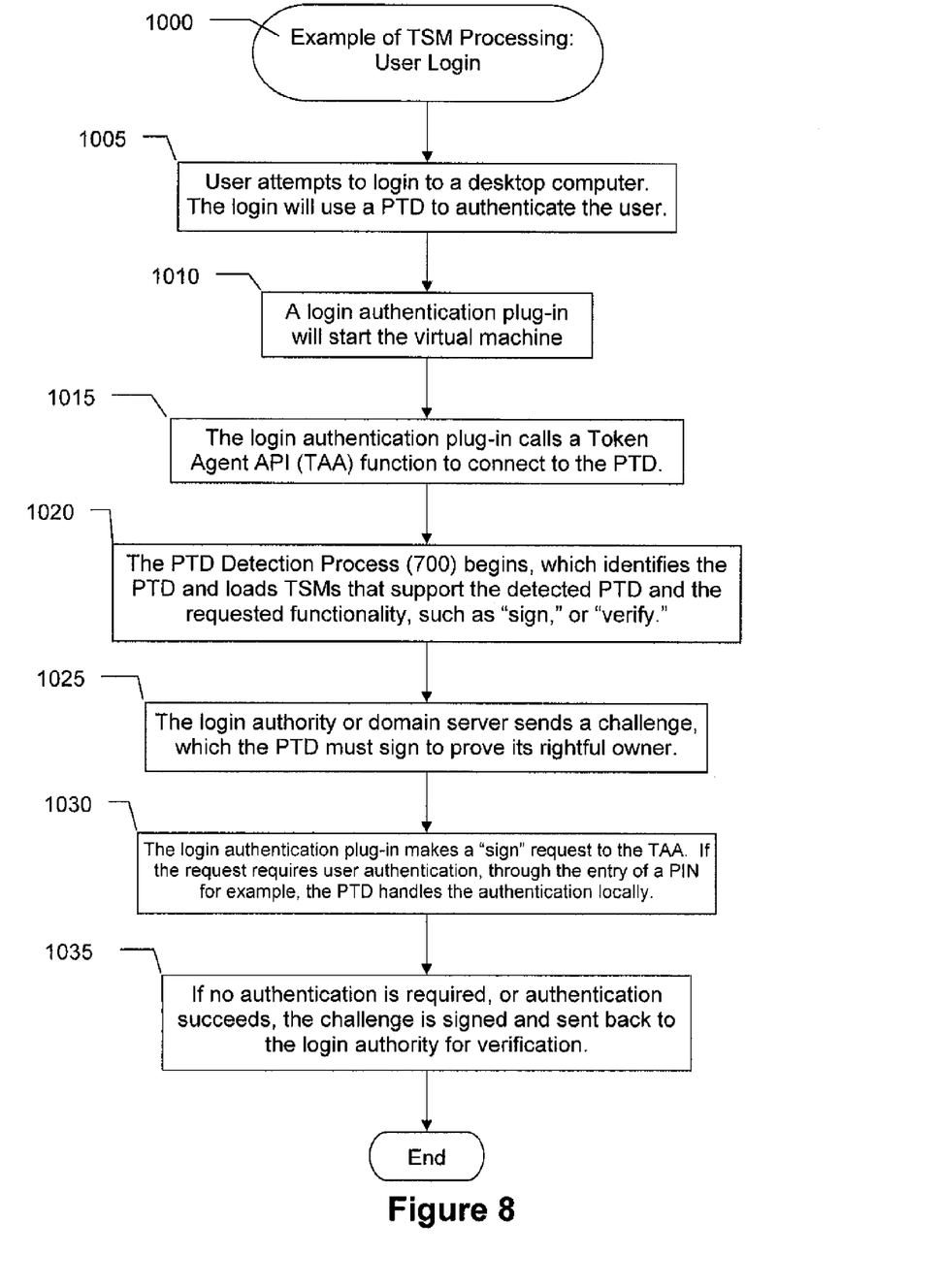

FIG. 8 is a flowchart of User Login Process 1000 which is illustrating yet another example of using an embodiment of the invention to verify user login information. This example shows the dynamic framework utilized in a "fat" client or desktop model instead of in a dynamic web server model. First, the user attempts to login to a desktop computer. This login screen will utilize the PTD to authenticate the user in step 1005. The login authentication plug-in will invoke a library containing the internal tiny virtual machine in step 1010. The login authentication plug-in will load the Token Agent API (TAA) function to connect to the PTD in step 1015. This function begins the PTD Detection Process which identifies the PTD and loads TSMs that support the detected PTD and the functionality requested by the web application, in this case authentication of the user in step 1020. Examples of the functionality required for user authentication are: sign, and verify. The login authority or domain server sends a challenge, which the PTD must sign to prove its rightful owner in step 1025. The login authentication plug-in calls into the TAA, which uses the specific TSM sign function in step 1030. If the request requires user authentication, such as verification of a PIN, a pin dialog is presented locally and the PIN is submitted directly to the PTD. This PIN dialog is browser and platform independent and submits the PIN directly to the PTD on the client machine without remove server interaction in step 1030. If user authentication is not required, or is required and succeeds, the challenge is signed and sent back to the login authority for verification in step 1035. This completes desktop authentication (user login) example.

Another aspect of the invention relates to an authentication proxy (or "TrustBearer Access"). TrustBearer Access is an intermediary program or communications gateway between the server and a client that provides for alternative authentication processes to identify the client to the server. The proxy authenticates that the site is a valid TrustBearer Access using an internal list. If the site is not on the internal list, then the site is denied access to the TAA. The proxy agent may then be used to broker legacy authentication methods, and add another level of authentication to the legacy method (e.g., username and password). Further, by using a diversified key, that is a key that has two or more encryption key components (e.g., a biometric key and a device serial number), a user's authentication credentials may be protected during transactions and transmission over the network.

The secured TrustBearer Access enables a user to authenticate with passwords without exposing them to the client machine. Passwords are stored in an internal database ("Password Store") using multiple encryption keys. The user's public key, TrustBearer diversified key, and an account key are used. To decrypt, TrustBearer Access passes a doubly-encrypted symmetric key to the client machine. The client machine decrypts one layer of the key using its private key and passes it to TrustBearer Access. TrustBearer Access decrypts the key using a diversified key and then uses the resulting key to decrypt the password stored in the database. This password is in turn communicated securely to the server in order to authenticate the user.

Figure 9:
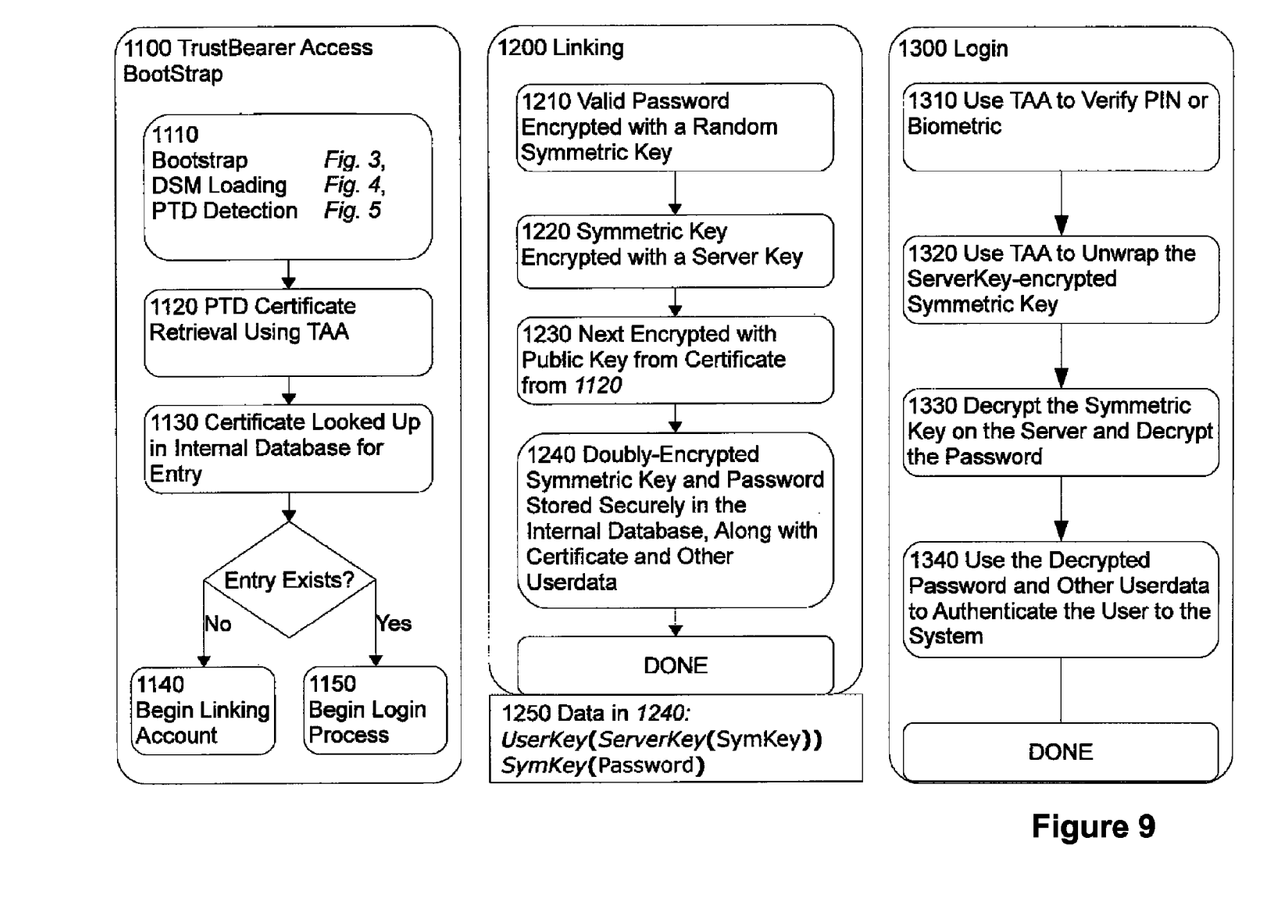
FIG. 9 is a flowchart illustrating another example of using an embodiment of the invention to serve as an authentication proxy for legacy authentication systems.

FIG. 9 is a flowchart illustrating the TrustBearer Access linking and authentication processes. The client machine initializes the "Bootstrap Process", "DSM Loading Process", and "PTD Detection Process" illustrated in FIGS. 3, 4, and 5. After this, the PTD's certificate is retrieved using the TAA in step 1120. This certificate is used to query the internal database on the proxy for an associated, or "linked" user account in step 1130. If no entry exists, step 1140 begins the linking process in 1200. Otherwise, the login process in 1300 is executed.

To start the linking process, a valid password is collected from the user and encrypted with a random symmetric key in step 1210. This symmetric key is encrypted with the server's public key in step 1220. This key is next encrypted in step 1230 with the public key from the certificate obtained from step 1120. The doubly-encrypted symmetric key, encrypted password, certificate, and other associated user data are transmitted and stored securely on the proxy in its internal database in step 1240. Item 1250 describes the algorithms to produce the first parts of the data transmitted for step 1240.

The login process is initialized by using the TAA to authenticate the user to the PTD by a authentication method such as PIN or Biometric match in step 1310. The TAA is then used to unwrap, or partially decrypt, the ServerKey-encrypted symmetric key in step 1320. This encrypted symmetric key is then sent to the proxy to be decrypted and then used to decrypt the password in step 1330. The other associated user data from the internal database and the decrypted password are then used to authenticate the user to the server in step 1340. Each level or layer of key encryption provides an additional "wrap" on user data sent between the processes involved in the authentication procedure. It would be further possible to add more layers of wrapping as the technology and level of desired security increases.

The methodologies described above may also dynamically chain support modules based on the functionality needed by a web application. Any type of support module may be verified using digital signature verification prior to inclusion and execution of the support modules. The client machine may cache support modules for offline usage of the software platform and the server may update client machines as needed using version control when the client is connected online. The software of the system may further derive a unique identifier from the PTD used for tracking and trend analysis, wherein logging of client events may be maintained in a database which is then subject to conventional data analysis. Transaction information relating to the identifying module may be stored and conventional data mining performed on such transaction information for purposes of usage trend recognition to tailor user customizations. The software may uniquely identify PTD's using a combination of PTD attributes, and may further track unsupported PTD's for trend analysis. In a similar vein, the software may generate events from the support modules based on PTD usage which may then be centrally recorded and used for statistical analysis, for example for threat analysis, system optimization, and trend recognition. Software may additionally assign unique usage behavior to each PTD and online application based on one or more of the following: registration, language and localization, usage trends, and user customizations; and thus link existing, issued PTD's to legacy online authentication mechanisms such as passwords.

Security may be further enhanced by restricting PTD usage and authentication handshaking only to limited trusted sites, so that phishing style attacks may be thwarted by the software blocking transmission of sensitive or identifying information to such untrusted sites. Such management of PTD software via a web server enables a central deployment of online applications using a uniform application-programming interface for usage of PTD's. Such management of PTD's may further support digital signatures using PTD's for online applications including but not limited to: voting, notary, contracts, financial transactions, and approval processes. In addition to the strong authentication using PTD's for online applications, such a web based system may provides online updates and personalization of PTD's and encryption and decryption capabilities using PTD's for online transmission of secure data.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A computer-implemented server comprising:
    a processor configured to:
        receive a service request from a client computing device;
        detect, in response to receiving the service request, a web browser type and a platform type of the client computing device;
        select a token browser control based on the web browser type and the platform type of the client computing device, wherein the token browser control includes a virtual machine;
        send the token browser control and a token discovery module to the client computing device, wherein the virtual machine allows the token discovery module to operate independently of the web browser type and the platform type at the client computing device;
        receive, from the token discovery module executed by the virtual machine at the client computing device, information related to a type and capabilities of an identifying device in communication with the client computing device;
        select identifying instructions based upon the type and capabilities of the identifying device;
        send the selected identifying instructions with a key, wherein the selected identifying instructions enable server interaction with the identifying device on the client computing device using the key; and
        verify a user of the client computing device based on communications between the server and the identifying device, and using the key.

2. The server of claim 1 wherein the processor is further configured to encrypt data before sending it to the client computing device.

3. The server of claim 1 wherein the client computing device is one of a personal computer connected to a communications network, a telephone, a user key fob, or other wired or wireless computing device that is able to access the server.

4. The server of claim 1 wherein the identifying device is one of a biometric device, a smart card, or other identity verification device.

5. The server of claim 1 wherein the processor is further configured to communicate using secure socket layer communication.

6. The server of claim 1 wherein the processor is further configured to send proxy agent instructions for interacting with the identifying device.

7. A computing device comprising:
    a processor configured to:
        execute a client browser on the computing device;
        send a server request over a network to a server, wherein the server request includes information that identifies a web browser type of the client browser and a platform type of the computing device;
        receive, from the server in response to sending the server request, a token browser control and a token discovery module, wherein the token browser control is selected based on the web browser type and the platform type, wherein the token browser control includes a virtual machine that allows the token discovery module to operate independently of the web browser type and the platform type at the computing device;
        execute the token discovery module within the virtual machine to ascertain and send, to the server, information related to a type and capabilities of an identifying device in communication with the computing device;
        receive, from the server, identifying instructions with a key, wherein the identifying instructions are selected based upon the type and capabilities of the identifying device, and wherein the selected identifying instructions enable server interaction with the identifying device using the key; and
        provide authentication of a transaction at the computing device using the identifying instructions, the identifying device, and the key.

8. The computing device of claim 7 wherein the processor is further configured to decrypt data received by the computing device.

9. The computing device of claim 7 wherein the computing device is one of a personal computer connected to a communications network, a web-enabled cell phone, a web enabled PDA, or other wired or wireless computing device that is able to access the server.

10. The computing device of claim 7 wherein the identifying device is one of a biometric device, a smart card, or other identity verification device.

11. The computing device of claim 7 wherein the processor is further configured to communicate using secure socket layer communication.

12. The computing device of claim 7 wherein the processor is further configured to receive proxy agent instructions and to send the service request to the server using the proxy agent instructions.

13. A computer-implemented method comprising:
    receiving a service request at a server from a client computing device;
    detecting, in response to receiving the service request, a web browser type and a platform type of the client computing device;
    selecting a token browser control based on the web browser type and the platform type of the client computing device, wherein the token browser control includes a virtual machine;
    sending the token browser control and a token discovery module to the client computing device, wherein the virtual machine allows the token discovery module to operate independently of the web browser type and the platform type at the client computing device;
    receiving, from the token discovery module executed by the virtual machine at the client computing device, information related to a type and capabilities of an identifying device in communication with the client computing device;

selecting identifying instructions based upon the type and capabilities of the identifying device;

sending the selected identifying instructions with a key, wherein the selected identifying instructions enable server interaction with the identifying device on the client computing device using the key; and authenticating a transaction at the client computing device using the identifying instructions, the identifying device, and the key.

14. The method of claim 13 wherein authenticating comprises authenticating with one of a personal computer connected to a communications network, a web-enabled cell phone, a web-enabled PDA, or other wired or wireless computing device that is able to access the server.

15. The method of claim 13 wherein the identifying device is one of a biometric device, a smart card, or other identity verification device.

16. The method of claim 13 wherein communication with the client computing device uses a secure socket layer communication.

17. The method of claim 13 further comprising sending proxy agent instructions to the client computing device to broker legacy authentication methods.

18. The method of claim 17 further comprising using a diversified key with the proxy agent instructions to authenticate a user of the client computing device.

19. The method of claim 13 further comprising storing transaction information relating to the identifying device.

20. The method of claim 13 wherein authenticating comprises determining a trusted status of a secure application by the identifying device.

* * * * *